(12) United States Patent
Chen et al.

(10) Patent No.: US 10,250,794 B2
(45) Date of Patent: Apr. 2, 2019

(54) CAPTURING AN IMAGE USING MULTI-CAMERA AUTOMATIC FOCUS

(71) Applicant: MOTOROLA MOBILITY LLC, Chicago, IL (US)

(72) Inventors: Yinhu Chen, Deerfield, IL (US); Daniel Bloom, Loveland, CO (US); Susan Yanqing Xu, Westmont, IL (US); Valeriy Marchevsky, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 168 days.

(21) Appl. No.: 15/398,532

(22) Filed: Jan. 4, 2017

(65) Prior Publication Data

US 2018/0191945 A1 Jul. 5, 2018

(51) Int. Cl.
*H04N 5/232* (2006.01)
*H04N 5/225* (2006.01)

(52) U.S. Cl.
CPC ....... *H04N 5/23212* (2013.01); *H04N 5/2258* (2013.01); *H04N 5/232121* (2018.08); *H04N 5/232122* (2018.08); *H04N 5/232123* (2018.08)

(58) Field of Classification Search
None
See application file for complete search history.

(56) References Cited

U.S. PATENT DOCUMENTS

| | | | |
|---|---|---|---|
| 4,924,317 A * | 5/1990 | Hirao | H04N 5/23212 348/351 |
| 8,213,786 B2 | 7/2012 | Song | |
| 8,416,303 B2 | 4/2013 | Gomi | |
| 9,703,175 B2 | 7/2017 | Dayana et al. | |
| 9,886,640 B1 | 2/2018 | Chen et al. | |
| 10,057,499 B1 | 8/2018 | Chen et al. | |
| 2002/0136435 A1 | 9/2002 | Prokoski | |
| 2007/0189583 A1 | 8/2007 | Shimada et al. | |
| 2008/0094486 A1 | 4/2008 | Fuh et al. | |

(Continued)

OTHER PUBLICATIONS

CN103780840B; A high-quality image forming apparatus and the imaging method of bis; Google Patents; English Translation; pp. 1-6; Jun. 8, 2016 (Year: 2016).*

(Continued)

*Primary Examiner* — Cynthia Segura
(74) *Attorney, Agent, or Firm* — Yudell Isidore PLLC (57) ABSTRACT

A method, system, and computer program product for an image capturing device having at least two cameras to obtain a focus point of a current scene. The method includes in response to performing a focus procedure via at least one camera of the image capturing device, determining whether a focus point has been found. The method further includes, in response to determining the focus point has not been found: (1) adjusting a number of focus scan steps of an auxiliary focus procedure utilized by only the at least one auxiliary camera and (2) performing the auxiliary focus procedure using the adjusted number of focus scan steps. The method further includes determining whether the focus point has been found, and in response to determining the focus point has been found, automatically synchronizing, to a main lens of the main camera, a current position of the lens of the at least one auxiliary camera.

20 Claims, 5 Drawing Sheets

(56) References Cited

U.S. PATENT DOCUMENTS

| | | | |
|---|---|---|---|
| 2010/0128938 A1 | 5/2010 | Chung et al. | |
| 2010/0134250 A1 | 6/2010 | Chung et al. | |
| 2012/0002082 A1 | 1/2012 | Johnson et al. | |
| 2012/0147139 A1 | 6/2012 | Li et al. | |
| 2012/0257065 A1 | 10/2012 | Velarde et al. | |
| 2013/0235163 A1* | 9/2013 | Joo | H04N 13/239 348/47 |
| 2014/0337930 A1 | 11/2014 | Hoyos et al. | |
| 2015/0092066 A1 | 4/2015 | Geiss et al. | |
| 2015/0244921 A1* | 8/2015 | Yamamoto | H04N 5/2354 348/345 |
| 2016/0227100 A1* | 8/2016 | Liu | H04N 5/232 |
| 2016/0295097 A1* | 10/2016 | Shanmugavadivelu | H04N 5/2254 |
| 2016/0299349 A1 | 10/2016 | Cho | |
| 2016/0301840 A1 | 10/2016 | Du et al. | |
| 2017/0017136 A1 | 1/2017 | Kao et al. | |
| 2017/0064184 A1* | 3/2017 | Tsai | H04N 5/23212 |
| 2017/0163902 A1 | 6/2017 | Wu | |
| 2017/0201684 A1 | 7/2017 | Kang et al. | |
| 2017/0277018 A1* | 9/2017 | Dayana | H04N 5/23212 |
| 2017/0324906 A1 | 11/2017 | Kang et al. | |
| 2018/0039845 A1 | 2/2018 | Chen et al. | |
| 2018/0096212 A1 | 4/2018 | Lin | |
| 2018/0139369 A1* | 5/2018 | Chen | H04N 5/2354 |
| 2018/0270408 A1* | 9/2018 | Chen | H04N 5/23212 |

OTHER PUBLICATIONS

CN103763477B; A two-focus imaging method and image forming apparatus after the first shot; Google Patents; English Translation ; pp. 1-5; Jun. 8, 2016 (Year: 2016).*

Bagheri, Saeid et al., U.S. Appl. No. 15/476,729, filed Mar. 31, 2017, The United States Patent and Trademark Office.
Chen, Yin-Hu et al., U.S. Appl. No. 15/353,435, filed Nov. 16, 2016, The United States Patent and Trademark Office.
Chen, Yin-Hu et al., U.S. Appl. No. 15/354,501, filed Nov. 17, 2016, The United States Patent and Trademark Office.
Chen, Yin-Hu, et al., U.S. Appl. No. 15/441,085, filed Feb. 23, 2017, The United States Patent and Trademark Office.
Chen, Yin-Hu, et al., U.S. Appl. No. 15/438,699, filed Feb. 21, 2017, The United States Patent and Trademark Office.
Chen, Yin-Hu, et al., U.S. Appl. No. 15/459,621, filed Mar. 15, 2017, The United States Patent and Trademark Office.
Li, Dalong, et al., U.S. Appl. No. 15/013,232, filed Feb. 2, 2016, The United States Patent and Trademark Office.
Li, Qiaotian, et al., U.S. Appl. No. 15/464,118, filed Mar. 20, 2017, The United States Patent and Trademark Office.
Matsimanis, Peter, et al., U.S. Appl. No. 15/435,503, filed Feb. 17, 2017, The United States Patent and Trademark Office.
Musatenko, Yuriy, et al., U.S. Appl. No. 15/349,948, filed Nov. 11, 2016, The United States Patent and Trademark Office.
Ho, Tuan V., Non-Final Office Action, U.S. Appl. No. 15/464,118, The United States Patent and Trademark Office, dated Feb. 23, 2018.
Pasiewicz, Daniel M., Non-Final Office Action, U.S. Appl. No. 15/354,501, The United States Patent and Trademark Office, dated Mar. 15, 2018.
Ngyuen, Luong Trung, Non-Final Office Action, U.S. Appl. No. 15/459,621, The United States Patent and Trademark Office, dated Sep. 19, 2018.
Giles, Nicholas G., Non-Final Office Action, U.S. Appl. No. 15/435,503, The United States Patent and Trademark Office, dated Jun. 21, 2018.
Monk, Mark T., Final Office Action, U.S. Appl. No. 15/464,118, The United States Patent and Trademark Office, dated Aug. 21, 2018.

* cited by examiner

CAPTURING AN IMAGE USING MULTI-CAMERA AUTOMATIC FOCUS

BACKGROUND

1. Technical Field

The present disclosure generally relates to electronic devices for capturing images.

2. Description of the Related Art

Modern image capturing devices, such as cellular phones, are equipped with cameras that can be used to capture images and/or video. These devices use a dedicated camera within the device to focus on a scene, capture an image/video, and provide a view of a scene on a viewfinder. The dedicated cameras are preconfigured with autofocus procedures or algorithms that adjust a position of a camera lens to find a focus point in a scene. Many image capturing device do not allow capture of an image/video until a focus point has been obtained in a scene. Thus, autofocus procedures/algorithms are typically limited to a short time interval in which a focus point in the scene is to be determined so that a user of the image capturing device may capture the images and/or video with minimum delay. Additionally, current contrast-based autofocus procedures/algorithms may minimize or significantly limit the number of multiple reverse focus scan cycles of the camera's lens in which the scan direction of the lens changes (e.g., changing the scan direction from near to far) to obtain the focus. Limiting the number of reverse focus scan cycles minimizes oscillation that is viewable on a viewfinder of the image capturing device is minimized. However, limiting the number of reverse focus scan cycles may have the side effect of causing a camera to misidentify a focus target, miss a focus point, and/or encounter a focus failure, all of which result in an unfocused captured image/video.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, system, and computer program product for an image capturing device having at least two cameras to obtain a peak focus of a current scene. The method includes concurrently performing, via at least one of a main camera and at least one auxiliary camera, a focus procedure for a current scene. The method further includes, in response to performing the focus procedure, determining whether a peak focus has been found. The method further includes, in response to determining the peak focus has not been found: (1) detecting a composition of the current scene, (2) adjusting a number of focus scan steps of an auxiliary focus procedure utilized by only the at least one auxiliary camera based on the composition of the current scene, and (3) performing, via a lens of the at least one auxiliary camera, the auxiliary focus procedure using the adjusted number of focus scan steps. The method further includes determining whether the peak focus has been found, and in response to determining the peak focus has been found, automatically synchronizing, to a main lens of the main camera, a current position of the lens of the at least one auxiliary camera.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within image capturing device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1:
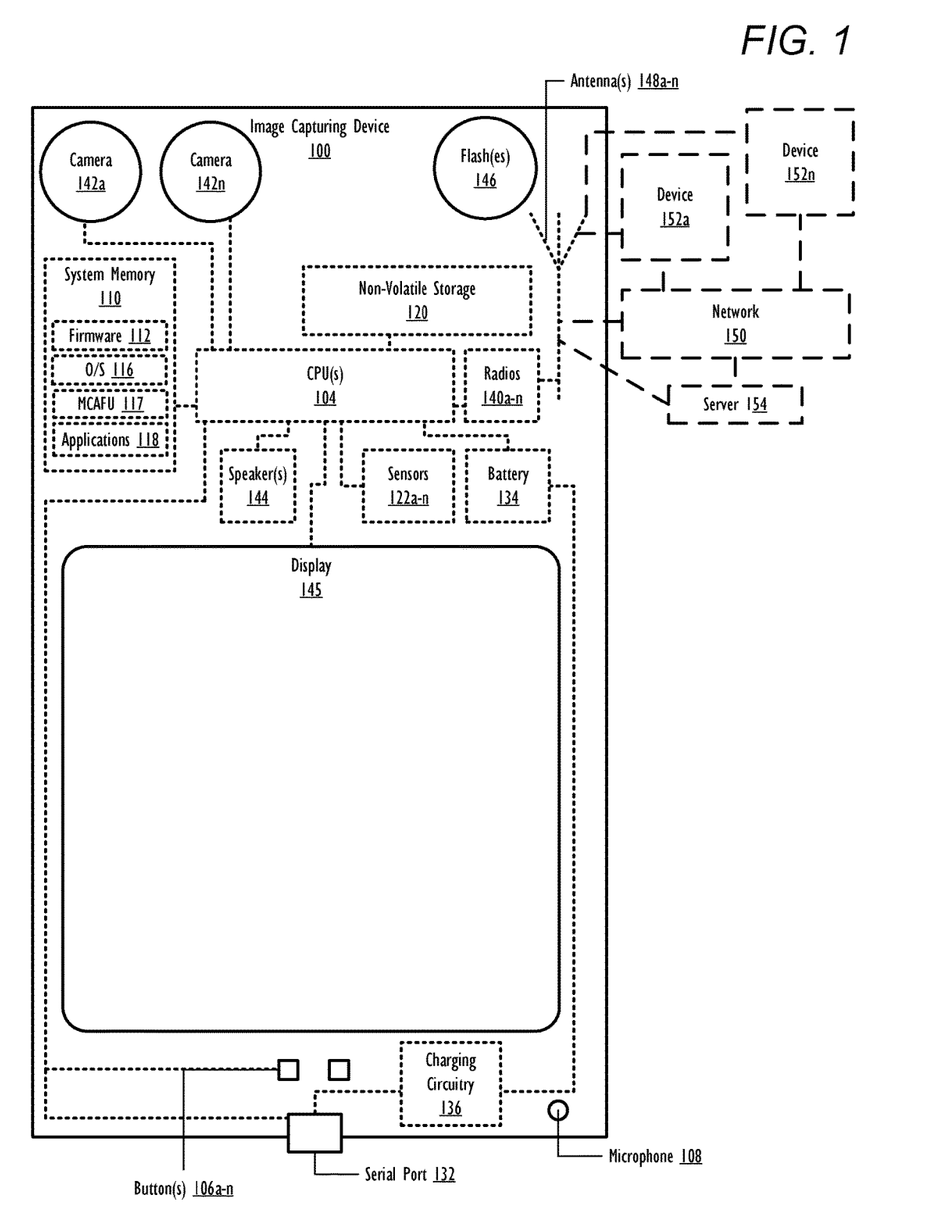
FIG. 1 illustrates an image capturing device within which certain aspects of the disclosure can be practiced, in accordance with one or more embodiments.

Now turning to FIG. 1, there is illustrated an example image capturing device 100 within which one or more of the described features of the various embodiments of the disclosure can be implemented. In one embodiment, image capturing device 100 can be any electronic device that is equipped with at least two cameras. Example image capturing devices can include, but are not limited to, a desktop computer, a monitor, a notebook computer, a mobile phone, a digital camera, a video recorder, or a tablet computer. Image capturing device 100 includes at least one processor or central processing unit (CPU) 104. CPU 104 is coupled to non-volatile storage 120 and system memory 110, within which firmware 112, operating system (OS) 116, multi-camera autofocus utility (MCAFU) 117, and applications 118 can be stored for execution on CPU 104. According to one aspect, MCAFU 117 executes within image capturing device 100 to perform the various methods and functions described herein. In one or more embodiments, MCAFU 117 determines and/or verifies, within a current scene, a peak focus via at least one auxiliary camera, and MCAFU 117 synchronizes the peak focus to a main camera that is used to capture an image/media. For simplicity, MCAFU 117 is illustrated and described as a stand-alone or separate software/firmware/logic component, which provides the specific functions and methods described below. However, in at least one embodiment, MCAFU 117 may be a component of, may be combined with, or may be incorporated within firmware 112, or OS 116, and/or within one or more of applications 118.

As shown, image capturing device 100 may include input devices and output devices that enable a user to interface with image capturing device 100. In the illustrated embodiment, image capturing device 100 includes at least two cameras 142a-n, camera flash(es) 146, display 145, hardware buttons 106a-n, microphone(s) 108, and speaker(s) 144. While two cameras (cameras 142a-n) are illustrated, in one or more embodiments image capturing device 100 may include additional cameras. Hardware buttons 106a-n are selectable buttons which are used to receive manual/tactile input from a user to control specific operations of image capturing device 100 and/or of applications executing thereon. In one embodiment, hardware buttons 106a-n may also include or may be connected to one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of image capturing device 100. In one embodiment, hardware buttons 106a-n may include a keyboard. Microphone(s) 108 may be used to receive spoken input/commands from a user. Speaker(s) 144 is used to output audio.

CPU(s) 104 is also coupled to sensors 122a-n and display 145. Sensors 122a-n can include, but are not limited to, at least one of: infrared (IR) sensors, thermal sensors, light sensors, proximity sensors, camera/image sensors, accelerometers, gyroscopes, magnetometers, barometers, air humidity sensors, pedometers, heart rate monitors, fingerprint sensors, radiation sensors, and iris scanners. Display 145 is capable of displaying text, media content, and/or a graphical user interface (GUI) firmware and/or one or more applications executing on image capturing device 100. The GUI can be rendered by CPU 104 for viewing on display 145, in one embodiment, or can be rendered by a graphics processing unit (GPU), in another embodiment. In one embodiment, display 145 is a touch screen that is also capable of receiving touch input from a user of image capturing device 100, when the user is interfacing with a displayed GUI. In at least one embodiment, image capturing device 100 can include a plurality of virtual buttons or affordances that operate in addition to, or in lieu of, hardware buttons 106a-n. For example, image capturing device 100 can be equipped with a touch screen interface and provide, via a GUI, a virtual keyboard or other virtual icons for user interfacing therewith. In at least one embodiment, image capturing device 100 can include a plurality of virtual buttons or affordances that operate in addition to or in lieu of hardware buttons 106a-n.

Image capturing device 100 also includes battery 134, charging circuitry 136, and serial port 132 (e.g., a USB (universal serial bus) port). Serial port 132 can operate as a charging port that receives power via an external charging device (not pictured) for charging battery 134 via charging circuitry 136. Battery 134 may include a single battery or multiple batteries for providing power to components of image capturing device 100. Serial port 132 may also function as one of an input port, an output port, and a combination input/output port. In one embodiment, battery 134 may include at least one battery that is removable and/or replaceable by an end user. In another embodiment, battery 134 may include at least one battery that is permanently secured within/to image capturing device 100.

Image capturing device 100 may also include one or more wireless radios 140a-n and can include one or more antenna(s) 148a-n that enable image capturing device 100 to wirelessly connect to, and transmit and receive voice and/or data communication to/from, one or more other devices, such as devices 152a-n and server 154. As a wireless device, image capturing device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, image capturing device 100 may be further equipped with IR device (not pictured) for communicating with other devices using an IR connection. In another embodiment, wireless radios 140a-n may include a short-range wireless device, including, but not limited to, a near field communication (NFC) device. In still another embodiment, image capturing device 100 may communicate with one or more other device(s) using a wired or wireless USB connection.

Figure 2:
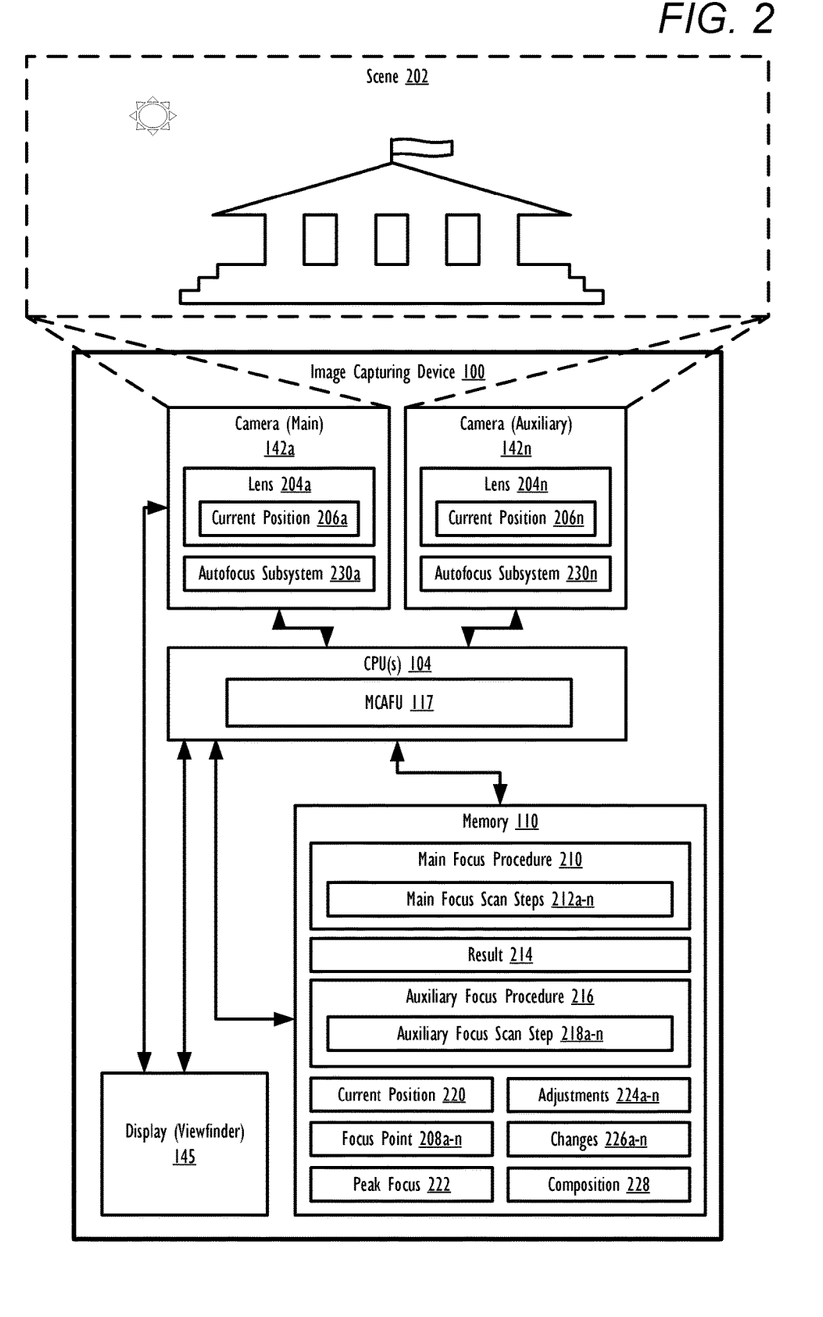
FIG. 2 illustrates an example image capturing device configured to obtain a peak focus of a current scene using at least two cameras, in accordance with one or more embodiments.

FIG. 2 is a block diagram illustrating additional functional components within example image capturing device 100, which is configured to obtain a peak focus of a current scene using at least two cameras, in accordance with one or more embodiments of the present disclosure. As illustrated, image capturing device 100 includes CPU(s) 104, memory 110, main camera 142a, auxiliary camera 142n, and display (viewfinder) 145. In one or more embodiments, auxiliary camera 142n may include multiple auxiliary cameras. In one or more embodiments, main camera 142a and/or auxiliary camera 142n may be used to capture images and/or video. Each of cameras 142a-n is configured with a lens 204a-n and at least one autofocus subsystem 230a-n, which is used in conjunction with a focus procedure (e.g., main focus procedure 210) to move lenses 204a-n of cameras 142a-n into focus. Autofocus subsystems 230a-n may include, but are not limited to, a contrast-based subsystem, time of flight (ToF) subsystem, and/or phase detection auto focus (PDAF) subsystem. Autofocus subsystems 230a-n include at least one component to assist lenses 204a-n in obtaining a focus point, such as at least one sensor, rangefinder, motor, laser and/or assist lamp.

As presented herein, a focus procedure (e.g., main focus procedure 210) provides a set of default instructions for manipulating at least one autofocus subsystem (e.g., autofocus subsystem 230a) to automatically focus a lens (e.g., lens 204a) of a corresponding camera (e.g., main camera 142a) on current scene 202. Lens 204a may be adjusted to any position in a given range of positions, based on a current step setting applied to that lens. For example, lens 204a may be set to any position from among 1000 logical steps (e.g., any position from among 0-999 steps, where 0 is a near focus and 999 is a far focus). Main focus procedure 210 defines at least one focus algorithm that is performed by main camera 142a to determine a focus point (e.g., focus point 208a) in a scene. A focus point identifies a particular position of a lens (e.g., lens 204a) of a corresponding camera (e.g., camera 142a) for which at least a point or area (e.g., a subject or background) of current scene 202 is in focus. Main focus procedure 210 also includes focus scan steps 212a-n, which dictate, for a particular focus algorithm, the size of a step movement of a corresponding lens (e.g., lens 204a) across the given step range for a corresponding camera (e.g., main camera 142a). For example, if a focus scan step 212a is set to 64 for coarse scanning, lens 142a moves in steps of 64 during a corresponding coarse scanning focus procedure of main focus procedure 210 until a focus peak (e.g., focus peak 208a) is found and/or a different focus algorithm (e.g., fine scanning focus procedure) is utilized. Auxiliary focus procedure 216 provides a set of instructions for automatically focusing on current scene 202 by lens 204n of auxiliary camera 142n. Auxiliary focus procedure 216 defines at least one focus algorithm that is used by auxiliary camera 142n to determine a focus peak (e.g., focus peak 208b) in a scene. Auxiliary focus procedure 216 further includes auxiliary focus scan steps 218a-n. Each of auxiliary focus scan steps 218a-n dictates, for a particular focus algorithm associated with auxiliary focus procedure 216, a size of a step movement of lens 204n across a given step range. During a focus procedure, a camera attempts to identify a focus peak (e.g., focus peak 208a-n) in current scene 202 by stepping (moving), via autofocus subsystems 230a-n, a lens forward by a number of steps established by focus scan step 212a. In one embodiment, lens 204a may be moved forward and/or backward during main focus procedure 210. In one embodiment, main focus procedure 210 may limit a number of reverse directional changes (also referred to herein as reverse scan cycles or reverse scans) by lens 204a to prevent rapid oscillation of a view of current scene 202 provided on display 145. Main focus procedure 210 and auxiliary focus procedure 216 may be initiated in response to activation/initiation of at least one of main camera 142a and auxiliary camera 142n and/or activation/initiation of a particular application (e.g., a camera application). Auxiliary camera 142n may simultaneously perform auxiliary focus procedure 216 while main camera 142a performs main focus procedure 210. Main camera 142a continually outputs its current frame (a live representation of current scene 202 as captured by main camera 142a) to display 145. It should be noted that in one or more embodiments, only a real-time view of a current frame of main camera 142a is viewable on viewfinder 145, and a current frame of auxiliary camera 142n is not viewable on viewfinder 145. Thus, a change in a current frame that is associated with a movement of lens 204n of auxiliary camera 142n, as captured by auxiliary camera 142n during auxiliary focus procedure 216, is not viewable on viewfinder 145 for a user of image capturing device 100. In one embodiment, main focus procedure 210 is an optimized focus procedure that provides a best experience for a user viewing current scene 202 via viewfinder 145.

In one example, a camera (e.g., camera 142a) performing a focus procedure (e.g., main focus procedure 210) determines a focus point (e.g., focus point 208a) by (1) measuring, via an contrast-based autofocus subsystem (e.g., autofocus subsystem 230a), a difference in contrast between adjacent pixels of a camera sensor that is capturing current scene 202 and (2) sequentially adjusting a position of a lens (e.g., lens 204a) (within the constraints provided by a corresponding focus procedure) until a maximum contrast difference is determined. When the maximum contrast difference is determined, the position of the lens of that camera is identified as the focus point (e.g., focus point 208a) and is returned to the processor (e.g., CPU 104). Alternatively, CPU 104 may automatically retrieve focus point 208a of the current scene from camera 142a in response to main focus procedure 210 completing. In another example, a camera (e.g., camera 142n) performs auxiliary focus procedure 216 to determine a focus point (e.g., focus point 208n) by comparing incoming light at two different parts of a lens (e.g., lens 142n), via a PDAF subsystem (e.g., autofocus subsystem 230n), and adjusting a position of the lens, as provided by auxiliary focus procedure 216, until an equivalent light pattern is viewed at both parts of the lens. A focus procedure has failed when a camera cannot determine a focus point. A camera may terminate adjustment of the lens when the focus procedure has failed. This may result in the lens being at an unfocused or suboptimal position.

In one embodiment, in response to a focus procedure (e.g., main focus procedure 210 and auxiliary focus procedure 216) completing, a camera 142a generates result 214 which is provided to CPU 104. Result 214 may include, for example, phase detection auto focus (PDAF) data, contrast-based auto focus data, time of flight data and/or a focus point (e.g., focus point 208a) of current scene 202, if the corresponding focus procedure successfully completed. In one embodiment, a result generated by main camera 142a during main focus procedure 210 may be synchronized, by CPU 104, to auxiliary camera 142n prior to performing auxiliary focus procedure 216. For example, contrast-based auto focus data obtained by main camera 142a during main focus procedure 210 may be synchronized to auxiliary camera 142n prior to performing auxiliary focus procedure 216. CPU 104 may then utilize the auto focus data obtained by main camera 142a to establish lens 204n to a particular initial position prior to performing auxiliary focus procedure 216.

In response to a first instance of main focus procedure 210 and/or auxiliary focus procedure 216 completing, CPU 104 determines, from result 214, whether a focus point (e.g., focus point 208a) was found by at least one of cameras 142a-n. In one embodiment, image capturing device 100 may be unable to identify focus point 208a for current scene 202 by either main camera 142a or auxiliary camera 142n. In response to determining focus point 208a could not be found, CPU 104 applies adjustment(s) (e.g., adjustment 224a) to auxiliary focus procedure 216. It should be noted that adjustments 224a-n applied to auxiliary focus procedure 216 apply to only auxiliary focus procedure 216 and do not affect main focus procedure 210. Additionally, performing auxiliary focus procedure 216 does not affect the performance of main focus procedure 210. In one embodiment, adjustments 224a-n may include a modification that increases or decreases auxiliary focus scan steps 218a-n for at least one scanning type of auxiliary focus procedure 216. For example, adjustments 224a may increase a coarse scan step size (e.g. auxiliary focus scan step 218a) from a size of 32 to a size of 64. In another embodiment, adjustments 224a-n may further identify a number of reverse scans (e.g., 3 reverse scans) to be performed by auxiliary camera 142n during auxiliary focus procedure 216. In another embodiment, adjustments 224a-n may specify a maximum number of reverse scans that are permitted by auxiliary focus procedure 216. In one embodiment, a number of permitted reverse scans provided/permitted by auxiliary focus procedure 216 is greater than a number of reverse scans provided/permitted by main focus procedure 210. The use of a greater number of reverse scan cycles enables auxiliary camera 142n to identify an improved focus point (e.g., focus point 208n) versus a focus point (e.g., focus point 208a) determined by main camera 142a. Since a change in a current frame that is associated with a movement of lens 204n of auxiliary camera 142n is not viewable on viewfinder 145, the increased number of reverse scans provided by auxiliary focus procedure 216, which ordinarily may be distracting and/or disorienting to a user, are not viewable by a user of image capturing device 100.

In one or more embodiments, CPU 104 detects and/or analyzes, by at least one of main camera 142a and auxiliary camera 142n, a composition (e.g., composition 228) of current scene 202. Composition 228 identifies a general makeup of current scene 202. For example, composition 228 may identify a flatness of current scene 202 (e.g., whether current scene 202 is a flat scene or a non-flat scene). A flat scene is a scene having a minimal level of detail, texture, and/or edges. For example, a scene including primarily a table-top surface with little texture/detail may be a flat scene. A non-flat scene is a scene having an increased level of detail, texture, and/or edges. For example, a scene including multiple subjects each having textured surfaces may be a non-flat scene. In one embodiment, composition 228 may identify a particular level of texture and/or a number of edges detected within current scene 202. Prior to performing auxiliary focus procedure 216, CPU 104 may establish a number of focus scan steps (e.g., auxiliary focus scan steps 218a) of auxiliary focus procedure 216 based on composition 228 of current scene 202. For example, in response to detecting current scene 202 is a flat scene, CPU 104 may increase auxiliary focus scan steps 218a above a default/pre-established level prior to performing auxiliary focus procedure 216. In another example, in response to detecting current scene 202 is a non-flat scene, CPU 104 may decrease auxiliary focus scan steps 218a below a default/pre-established level prior to performing auxiliary focus procedure 216. In another embodiment, CPU 104 may further adapt adjustments 224a-n based on composition 228. For example, for a flat scene, CPU 104 may adapt adjustments 224a-n, based on a composition level of current scene 202 identified in composition 228, to include a modification that increases a step size associated with auxiliary focus scan steps 218a. For a non-flat scene, CPU 104 may adapt adjustments 224a-n, based on a composition level of current scene 202 identified in composition 228, to include a modification that decreases a step size associated with auxiliary focus scan steps 218a.

In response to applying adjustment 224a to auxiliary focus procedure 216, auxiliary camera 142n continues performing auxiliary focus procedure 216. CPU 104 then determines whether camera 142n detects focus point 208b. In response to determining focus point 208b has not been found by auxiliary camera 142n, CPU 104 determines additional adjustments (e.g., adjustment 224b) to apply to auxiliary focus procedure 216. CPU 104 then applies adjustment 224b to auxiliary focus procedure 216 and camera 142n performs auxiliary focus procedure 216 using adjustment 224b. This process continues in an iterative fashion until auxiliary camera 142n detects focus point 208b. In one or more embodiments, main camera 142a simultaneously performs main focus procedure 210 while auxiliary camera 142n performs auxiliary focus procedure 216. In another embodiment, CPU 104 may establish current position 206 of lens 204a to a closest focus identified by a first performance of main focus procedure 210 prior to performing an iteration auxiliary focus procedure 216.

In response to determining focus point 208b, CPU 104 identifies current position 206n of lens 204n. CPU 104 then synchronizes current position 206n to main lens 204a such that current position 206a of main lens 204a is established at a same position as current position 206n of auxiliary lens 204n. In one embodiment, CPU 204 may calculate and apply one or more minor adjustments to current position 206a to compensate for differences between camera 142a and auxiliary camera 142n, such as differences in a camera type (e.g., model and/or manufacturer) and/or differences in the physical location and/or orientation of lens 204a versus lens 204n. In one or more embodiments, in response to determining focus point 208b, CPU 104 may also identify/ confirm focus point 208b as peak focus 222. Peak focus 222 is an optimized focus point in which the position of a lens (e.g., lens 206n) of a corresponding camera (e.g., camera 142n) is at a maximum focus for a point or area (e.g., a subject or background) in current scene 202.

In one embodiment, image capturing device 100 identifies a focus point (e.g. focus point 208a) via main camera 142a during an initial performance of main focus procedure 210 and returns result 214, which includes focus point 208a, to CPU 104. In response to determining focus point 208a has been found, CPU 104 performs a verification of focus point 208a using auxiliary camera 142n. To verify focus point 208a, CPU 104 sequentially performs auxiliary focus procedure 216 via auxiliary camera 142n. Each iteration of auxiliary focus procedure 216 generates a focus point (e.g., focus points 208b-n). Each focus point (e.g., focus point 208n) identified during the sequential auxiliary focus procedures 216 is compared to a previously generated focus point (e.g., focus point 208n-1) generated from auxiliary focus procedure 216 until two consecutive focus points (e.g., focus point 208n and focus point 208n-1) are determined to be substantially equivalent. For each iteration of auxiliary focus procedure 216, CPU 104 decreases a size and/or an amount of steps established by at least one of auxiliary focus scan steps 218a-n. In another embodiment, CPU 104 may also modify a number of reverse scans of auxiliary focus procedure 216. For example, in a first iteration of auxiliary focus procedure 216, CPU 104 may decrease a focus scan step size (e.g. auxiliary focus scan step 218a) corresponding to a fine scanning from a size of 16 to a size of 12. In one embodiment, each reverse scan of auxiliary focus procedure 216 utilizes a different step size. Auxiliary camera 142n then performs auxiliary focus procedure 216 using the modified auxiliary focus scan steps 218a-n to detect a focus point (e.g., focus point 208b). For a next iteration of auxiliary focus procedure 216, CPU 104 then further decreases a size and/or an amount of steps established by at least one of auxiliary focus scan steps 218a-n (e.g., decreasing the fine scanning focus scan step size from 12 to 8) and auxiliary camera 142n again performs auxiliary focus procedure 216 using the modified auxiliary focus scan steps 218a-n to detect a next focus point (e.g., focus point 208c). CPU 104 then compares the two focus points (e.g., focus point 208b and focus point 208c) detected by auxiliary camera 142n to determine whether they are equivalent. In response to determining focus point 208b and focus point 208c are not equivalent, CPU 104 (1) stores the most recent focus point (e.g., focus point 208c) to memory and (2) decreases a size of at least one of focus scan steps 218a-n. Auxiliary camera 142n then re-performs auxiliary focus procedure 216 in an iterative manner until two consecutive/sequential focus points are found to be substantially equivalent. It should be noted that in one or more embodiments, the two consecutive focus points do not have to be identical to be determined by CPU 104 as equivalent. Rather, CPU 104 may confirm two consecutive focus points as equivalent in response to determining that the consecutive focus points are within a particular tolerance/variance. In response to determining two consecutive focus points (e.g., focus points 208b-c) are equivalent, CPU 104 confirms the most recent focus point (e.g., focus point 208c) as peak focus 222. In response to confirming the most recent focus point as peak focus 222, CPU 104 then identifies lens position 206n associated with peak focus 222 and synchronizes lens position 206a of main lens 204a to the current lens position (lens position 206n) of auxiliary lens 204n. Thus, current position 206a of main lens 204a is established at a same position as auxiliary lens 204n.

In one embodiment where main camera 142a simultaneously performs main focus procedure 210 while auxiliary camera 142n performs auxiliary focus procedure 216, main camera 142a and auxiliary camera 142n may both detect a focus point (e.g., focus points 208a and focus point 208n). In this event, CPU 104 performs a verification of a preconfigured one of focus point 208a and focus point 208n using auxiliary camera 142n.

In one embodiment, in synchronizing position 206a of lens 204a to position 206n, CPU 204 may further apply one or more minor adjustments to current position 206a to compensate for a difference in physical location and/or orientation of lens 204a on image capturing device 100 versus lens 204n. In another embodiment, in response to synchronizing position 206a of lens 204a to position 206n, main camera 142a may perform at least one supplemental fine scan via main focus procedure 210 and/or apply a fine adjustment to position 206a of main lens 204a.

In one embodiment, after synchronizing position 206a of main lens 204a to that (position 206n) of auxiliary lens 204n, CPU 104 may continually perform a verification of peak focus 222 via auxiliary camera 142n and compare a focus point (e.g., focus points 208b-n) identified in each subsequent verification against peak focus 222. In response to detecting a mismatch between an identified focus point (e.g., focus point 208n) and peak focus 222, CPU 104 automatically establishes a verified focus point (e.g., focus point 208n) as peak focus 222 and synchronizes position 206a of main lens 204a to that of the auxiliary lens 204n. In another embodiment, CPU 104 triggers auxiliary camera 142n to continually perform, auxiliary focus procedure 216 and monitors results returned by auxiliary camera 142n. The data contained in the results may be monitored over time for changes 226a-n. Changes 226a-n may include any changes within current scene 202, including, but not limited to, changes in lighting, perspective, subjects/content, and/or background. For example, CPU 104 may monitor PDAF data or contrast-based auto focus data in result 214 for differences. In response to detecting differences in the monitored data, CPU 104 analyzes a level of change associated with changes 226a-n to determine whether the detected changes 226a-n are above a pre-determined threshold that indicates an adjustment to peak focus 222 is needed to compensate for changes 226a-n. In response to determining the changes 226a-n exceed the pre-determined threshold, CPU 104 performs a verification of peak focus 222, as described above, to identify a new peak focus. In response to identifying a new peak focus, CPU 104 establishes the new peak focus as peak focus 222 and re-synchronizes position 206a of main lens 204a to the position (position 206n) of auxiliary lens 204n.

In one embodiment, CPU 104 may monitor current scene 202 for changes 226a-n via main camera 142a while auxiliary camera 142n is simultaneously performing auxiliary focus procedure 216 to identify a focus point (e.g., focus point 208n) in current scene 202. For example, after applying adjustment 224a to auxiliary focus procedure 216, CPU 104 monitors current scene 202 for changes 226a-n via main camera 142a while auxiliary camera 142n performs auxiliary focus procedure 216.

Figure 3:
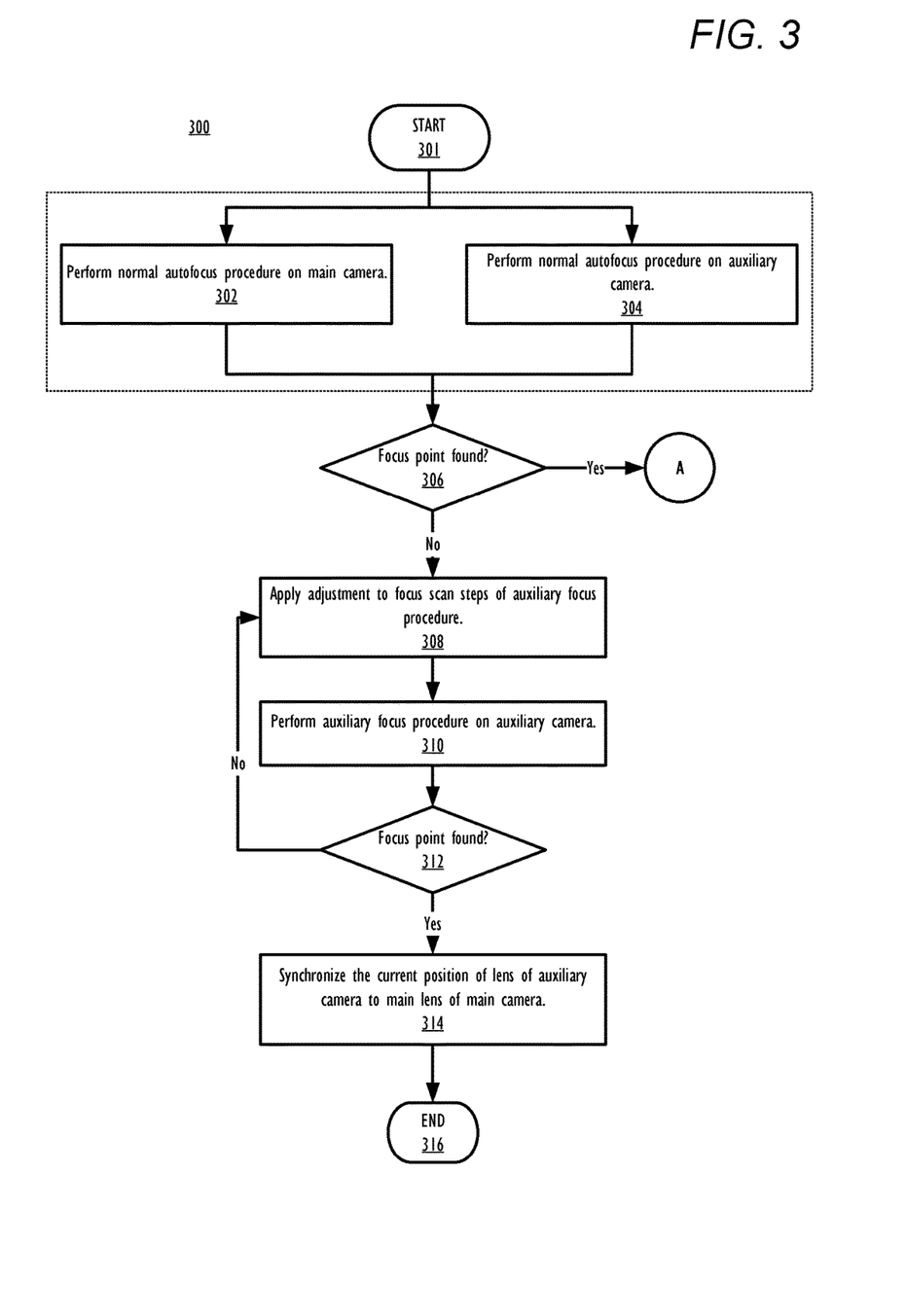
FIG. 3 is a flow chart illustrating a method for obtaining a peak focus of a current scene using at least two cameras, in accordance with one or more embodiments.
Figure 4:
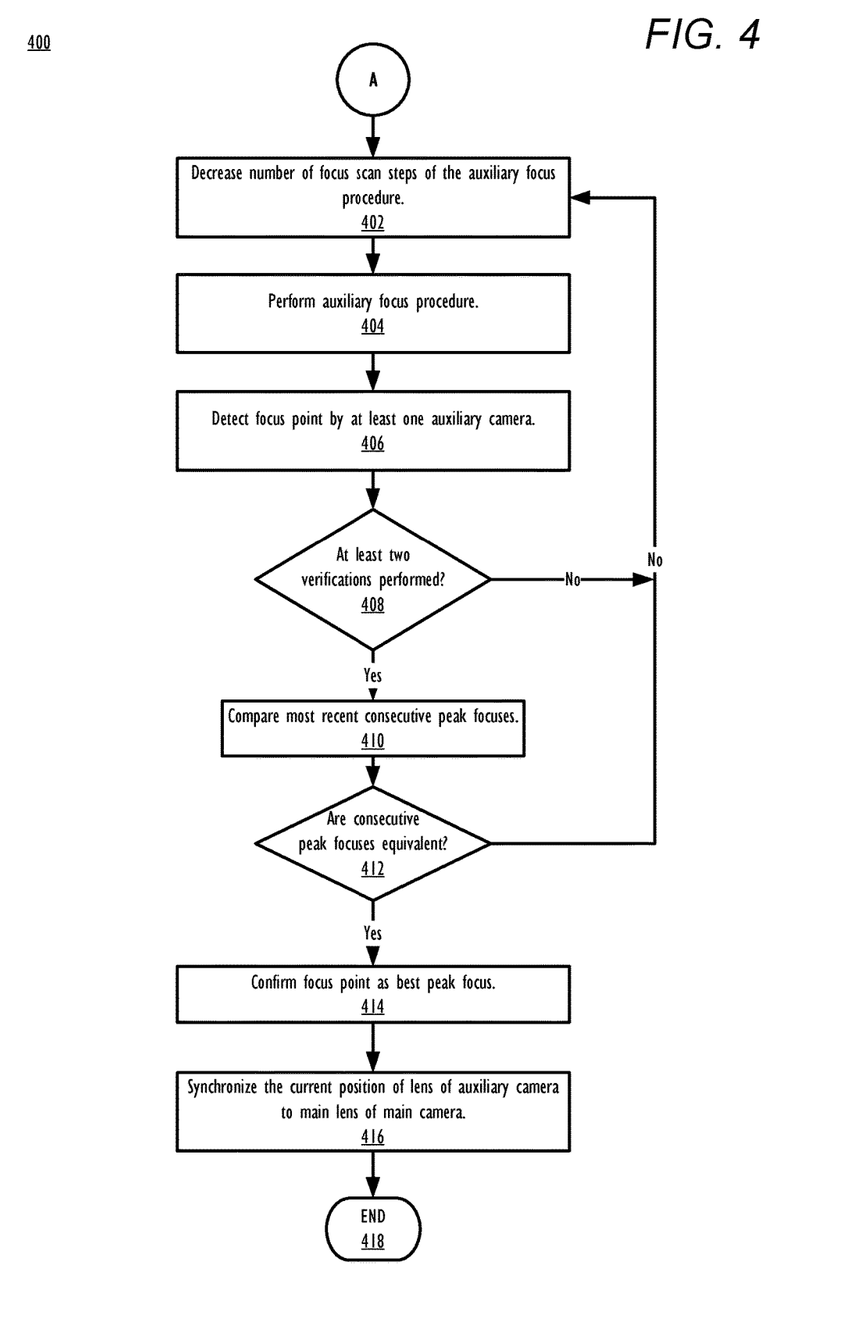
FIG. 4 is a flow chart illustrating a method for performing a verification of an identified peak focus, in accordance with one or more embodiments.

Referring now to FIGS. 3 and 4, there is depicted a high-level flow-chart illustrating a method for obtaining a focus point of a current scene using at least two cameras, in accordance with one or more embodiments of the present disclosure. Aspects of the method are described with reference to the components of FIGS. 1-2. Several of the processes of the method provided in FIGS. 3-4 can be implemented by a processor (e.g., CPU 104) executing software code of MCAFU 117 within an image capturing device (e.g., image capturing device 100). The method processes described in FIG. 3-4 are generally described as being performed by components of image capturing device 100.

Referring first to FIG. 3, method 300 commences at initiator block 301 then proceeds to block 302. At block 302, CPU 104 simultaneously performs (1) main focus procedure 210 via main camera 142*a* (block 302) and (2) auxiliary focus procedure 216 via auxiliary camera 142*n* (block 304). At block 306, CPU 104 determines, from a result(s) returned by cameras 142*a-n*, whether at least one of cameras 142*a-n* have detected a focus point. In response to determining at block 306 that a focus point has been found, CPU 104 performs a verification of the focus point, as described in FIG. 4.

In response to determining a focus point has not been found, CPU 104 applies adjustments 224*a-n* to auxiliary focus procedure 216 (block 308). At block 310, CPU 104 performs auxiliary focus procedure 216 via auxiliary camera 142*n*. It should be noted that while performing auxiliary focus procedure 216 via auxiliary camera 142*n*, CPU 104 may simultaneously perform main focus procedure 210 via camera 142*a* and/or monitor current scene 202 for changes 226*a-n*. At block 312, CPU 104 determines whether a focus point has been found. In response to determining at block 312 that a focus point has not been found, method 300 proceeds back to block 308. In response to determining at block 312 that a focus point has been found, method 300 proceeds to block 314. At block 314, CPU 104 synchronizes the current position (e.g., current position 206*a*) of main lens 204*a* of main camera 142*a* to current position 206*n* of auxiliary lens 204*n*. Method 300 then terminates at end block 316.

Referring also to FIG. 4, method 400 commences at block 402 and CPU 104, in response to determining that a focus point has been found, decreases a step size of at least one of focus scan steps 218*a-n* of auxiliary focus procedure 216. CPU 104 then performs auxiliary focus procedure 216 via auxiliary camera 142*n* (block 404). At block 406, auxiliary camera 142*n* detects a focus point (e.g., focus point 206*b*). At block 408, CPU 104 determines whether at least two focus points have been determined. In response to determining that only a single focus point has been determined, method 400 loops back to block 402 and another focus point is determined.

In response to determining (at block 408) that at least two focus points have been determined, method 400 proceeds to block 410 at which CPU 104 compares the most recent two consecutive focus points (e.g., focus point 206*n* and focus point 206*n*-1). At block 412, CPU 104 determines whether consecutive focus points, focus point 206*n* and focus point 206*n*-1, are substantially equivalent. In response to determining focus point 206*n* and focus point 206*n*-1 are not equivalent, method 400 loops back to block 402. In response to determining focus point 206*n* and focus point 206*n*-1 are substantially equivalent, CPU 104 confirms a most recent focus point (e.g., focus point 206*n*) as peak focus 222 (block 414). Method 400 then terminates at end block 416.

Figure 5:
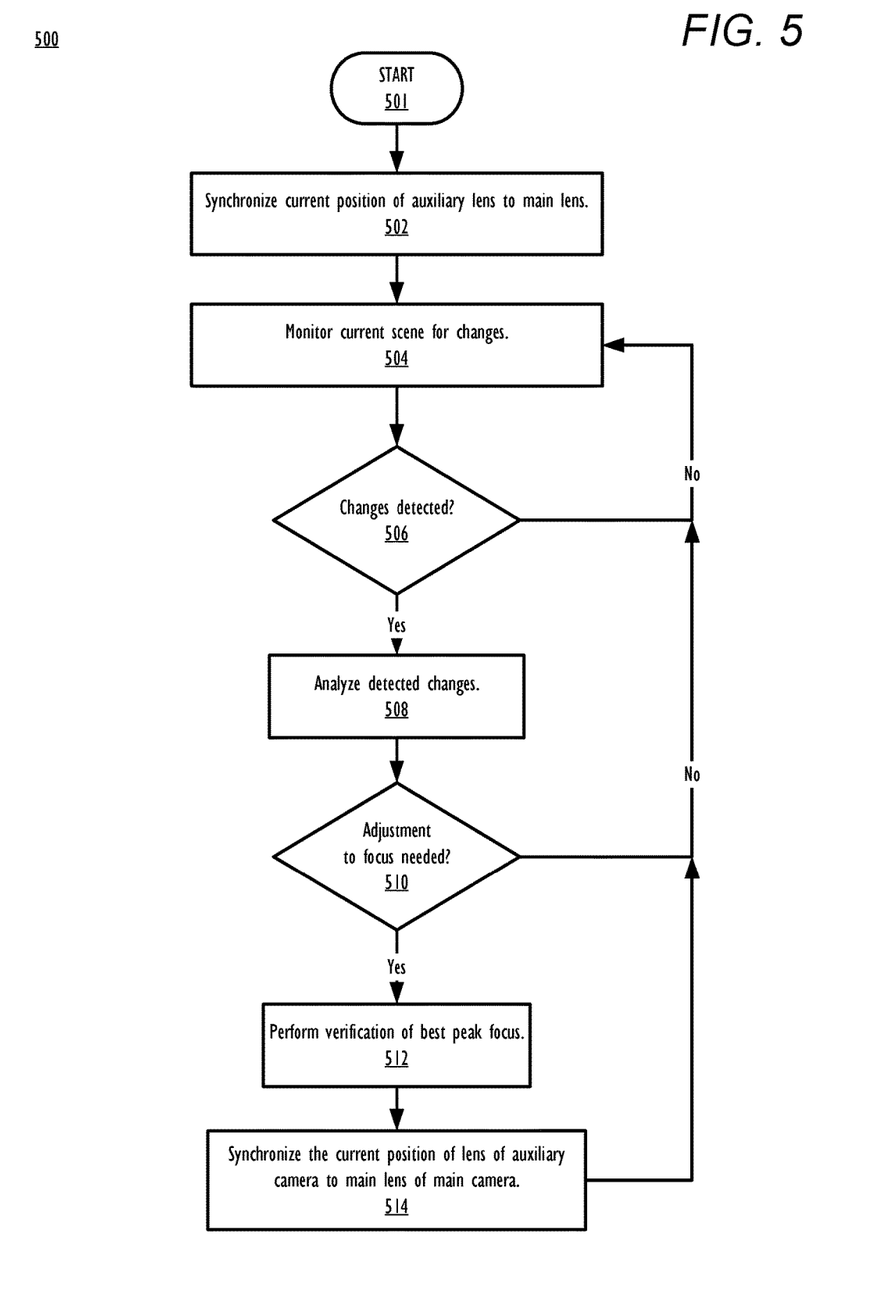
FIG. 5 is a flow chart illustrating a method for applying an adjustment to a peak focus based on changes in a current scene, in accordance with one or more embodiments.

Referring now to FIG. 5, there is depicted a high-level flow-chart illustrating a method for applying an adjustment to peak focus based on changes in a current scene, in accordance with one or more embodiments of the present disclosure. Aspects of the method are described with reference to the components of FIGS. 1-2. Several of the processes of the method provided in FIG. 5 can be implemented by a processor (e.g., CPU 104) executing software code of MCAFU 117 within an image capturing device (e.g., image capturing device 100). The method processes described in FIG. 5 are generally described as being performed by image capturing device 100.

Method 500 commences at initiator block 501 then proceeds to block 502. At block 502 the current position (e.g. current position 206*a*) of main lens 204*a* is synchronized to current position 206*n* of auxiliary lens 204*n*. At block 504, current scene 202 is monitored for changes 226*a-n*. At block 506, CPU 104 determines whether changes 226*a-n* in current scene 202 have been detected. In response to no changes being detected in current scene 202, method 500 loops back to block 504.

In response to detecting changes 226*a-n* in current scene 202 (at block 506), CPU 104 analyzes changes 226*a-n* (block 508). At block 510, CPU 104 determines, based on the analysis, whether an adjustment to peak focus 222 is needed to compensate for the detected changes 226*a-n* (block 510). In response to determining no adjustment is needed to compensate for the detected changes 226*a-n*, method 500 loops back to block 504. In response to determining an adjustment is needed, CPU 104 performs a verification (as described by FIG. 4) of peak focus 222 to determine a new peak focus (block 512). At block 514, CPU 104 synchronizes the current position (e.g., current position 206*a*) of main lens 204*a* of main camera 142*a* to current position 206*n* of auxiliary lens 204*n* (which is focused at new peak focus). Method 500 then loops back to block 504.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
concurrently performing a main focus procedure and an auxiliary focus procedure for a current scene via a main camera and at least one auxiliary camera, respectively, of an image capturing device;
determining whether a focus point has been found in the current scene; and
in response to determining the focus point has not been found:
dynamically adjusting a number of focus scan steps of the auxiliary focus procedure utilized by only the at least one auxiliary camera;
performing, via an auxiliary lens of the at least one auxiliary camera, the auxiliary focus procedure using the adjusted number of focus scan steps;
determining whether the focus point has been found; and
in response to determining the focus point has been found, automatically synchronizing a position of a main lens of the main camera to that of the auxiliary lens.

2. The method of claim 1, further comprising:
in response to performing the auxiliary focus procedure and determining the focus point has not been found:
dynamically adjusting the number of focus scan steps of only the auxiliary focus procedure; and
performing, via the auxiliary lens, the auxiliary focus procedure using the adjusted number of focus scan steps;
wherein:
the number of focus scan steps is dynamically readjusted and the auxiliary focus procedure is reperformed until the focus point has been found;
the main camera focus procedure is unaffected by any adjustments to the auxiliary focus procedure; and
the main camera focus procedure is unaffected by the performance of the auxiliary focus procedure.

3. The method of claim 1, further comprising:
in response to determining the focus point has been found by the main camera, synchronizing a position of the auxiliary lens to that of the main lens;
in response to determining the focus point has not been found, performing, via the at least one auxiliary camera until the focus point has been found, at least one reverse scan to identify the focus point, wherein each of the at least one reverse scan utilizes a different number of focus scan steps;
wherein a main focus procedure utilized by the main camera includes a main number of focus scan steps that is different from the number of focus scan steps of the auxiliary focus procedure, and wherein the main focus procedure is unaffected by the at least one reverse scan of the auxiliary focus procedure.

4. The method of claim 1, further comprising:
detecting, by at least one of the main camera and the at least one auxiliary camera, a composition of the current scene;
establishing the number of focus scan steps of the auxiliary focus procedure based on the composition; and
in response to determining the focus point has not been found:
determining from the composition whether the current scene is a flat scene;
in response to determining the current scene is a flat scene, increasing the number of focus scan steps of only the auxiliary focus procedure; and in response to determining the current scene is a non-flat scene, decreasing the number of focus scan steps of only the auxiliary focus procedure.

5. The method of claim 1, further comprising:
detecting, by at least one of the main camera and the at least one auxiliary camera, a composition of the current scene;
performing, via the at least one auxiliary camera, a first verification of the focus point;
performing, via the at least one auxiliary camera, a second verification of the focus point;
determining whether the first verification and the second verification identify a same focus point;
in response to determining the first verification and the second verification identify a same focus point, confirming the focus point as a peak focus and synchronizing the position of the main lens to that of the auxiliary lens; and
in response to determining the first verification and the second verification do not identify a same focus point, performing, via the at least one auxiliary camera, at least one subsequent verification of the focus point, wherein the verification of the focus point is repeated until two sequential verifications identify a same focus point.

6. The method of claim 5, wherein performing a verification of the focus point further comprises:
applying an adjustment to the number of focus scan steps of the auxiliary focus procedure based on the composition of the current scene;
performing, via the at least one auxiliary camera, the auxiliary focus procedure using the adjusted number of focus scan steps; and
identifying a second focus point by the at least one auxiliary camera.

7. The method of claim 5, further comprising:
in response to synchronizing the position of the main lens to that of the auxiliary lens, continually performing, via only the at least one auxiliary camera, a verification of the peak focus; and
in response to detecting a mismatch between the peak focus and a verification focus point identified during the verification of the peak focus:
performing, via the auxiliary lens, the auxiliary focus procedure; and
in response to performing the auxiliary focus procedure, automatically synchronizing the position of the main lens to that of the auxiliary lens.

8. The method of claim 1, further comprising continually outputting to a display, via the main camera, a current frame captured by the main camera, wherein only a real-time view of the current frame of the main camera is outputted to the display, while the auxiliary camera performs the auxiliary focus procedure.

9. The method of claim 1, further comprising establishing an initial position of the auxiliary lens to perform the auxiliary focus procedure using auto focus data obtained by the main camera during the main focus procedure.

10. An image capturing device comprising:
a main camera that performs a main focus procedure to identify a focus point in a current scene;
at least one auxiliary camera that concurrently performs anauxilairy focus procedure for the auxiliary camera;
a processor that is communicatively coupled to the main camera and the at least one auxiliary camera and which:
determines whether a focus point has been found in the current scene; and
in response to determining the focus point has not been found:
dynamically adjusts a number of focus scan steps of the auxiliary focus procedure;
triggers the at least one auxiliary camera to exclusively perform, via an auxiliary lens of the at least one auxiliary camera, the auxiliary focus procedure using the adjusted number of focus scan steps;
determines whether the focus point has been found by the at least one auxiliary camera; and
in response to determining the focus point has been found by the at least one auxiliary camera, automatically synchronizes, a position of a main lens of the main camera to that of the auxiliary lens.

11. The image capturing device of claim 10, wherein in response to performing the auxiliary focus procedure and determining the focus point has not been found, the processor:
dynamically adjusts the number of focus scan steps of only the auxiliary focus procedure; and
the at least one auxiliary camera exclusively performs, via the auxiliary lens, the auxiliary focus procedure using the adjusted number of focus scan steps;
wherein:
the processor dynamically readjusts the number of focus scan steps and the at least one auxiliary camera reperforms auxiliary focus procedure until the focus point has been found;
the main camera focus procedure is unaffected by any adjustments to the auxiliary focus procedure; and
the main camera focus procedure is unaffected by the performance of the auxiliary focus procedure.

12. The image capturing device of claim 10, wherein:
in response to performing the main focus procedure and determining the focus point has been found by the main camera, the processor synchronizes a position of the auxiliary lens to that of the main lens;
in response to determining the focus point has not been found, the at least one auxiliary camera performs, until the focus point has been found, at least one reverse scan to identify the focus point, wherein each of the at least one reverse scan utilizes a different number of focus scan steps; and
the main focus procedure utilized the main camera includes a main number of focus scan steps that is different from the number of focus scan steps of the auxiliary focus procedure, and wherein the main focus procedure is unaffected by the at least one reverse scan of the auxiliary focus procedure.

13. The image capturing device of claim 10, wherein:
at least one of the main camera and the at least one auxiliary camera detects a composition of the current scene; and
the processor:
establishes the number of focus scan steps of the auxiliary focus procedure based on the composition; and
in response to determining the focus point has not been found:
determines from the composition whether the current scene is a flat scene;
in response to determining the current scene is a flat scene, increases the number of focus scan steps of only the auxiliary focus procedure; and in response to determining the current scene is a non-flat scene, decreases the number of focus scan steps of only the auxiliary focus procedure.

14. The image capturing device of claim 10, wherein:
at least one of the main camera and the at least one auxiliary camera detects a composition of the current scene;
the at least one auxiliary camera:
performs a first verification of the focus point; and
performs a second verification of the focus point; and
the processor:
determines whether the first verification and the second verification identify a same focus point; and
in response to determining the first verification and the second verification identify a same focus point:
confirms the focus point as a peak focus; and
synchronizes the position of the main lens to that of the auxiliary lens; and
in response to determining the first verification and the second verification do not identify a same focus point, the at least one auxiliary camera performs at least one subsequent verification of the focus point, wherein the at least one subsequent verification of the focus point is repeated until two sequential verifications identify a same focus point.

15. The image capturing device of claim 14, wherein in performing a verification of the focus point:
the processor applies an adjustment to the number of focus scan steps of the auxiliary focus procedure based on the composition of the current scene; and
the at least one auxiliary camera:
performs the auxiliary focus procedure using the adjusted number of focus scan steps; and
identifies a second focus point.

16. The image capturing device of claim 14, wherein:
the at least one auxiliary camera, in response to synchronizing the position of the main lens to that of the auxiliary lens, continually performs a verification of the peak focus;
the processor detects a mismatch between the peak focus and a verification focus point identified during the verification of the peak focus;
in response to detecting the mismatch, the at least one auxiliary camera performs the auxiliary focus procedure; and
in response to detecting the completion of the auxiliary focus procedure, the processor automatically synchronizes the position of the main lens to that of the auxiliary lens.

17. A computer program product comprising:
a computer readable storage device; and
program code on the computer readable storage device that when executed by a processor associated with an image capturing device associated with a main camera and at least one auxiliary camera, the program code enables the device to provide the functionality of:
concurrently performing a main focus procedure and an auxiliary focus procedure for a current scene via a main camera and at least one auxiliary camera, respectively, of the image capturing device;
determining whether a focus point has been found in the current scene; and
in response to determining the focus point has not been found:
dynamically adjusting a number of focus scan steps of the auxiliary focus procedure utilized by only the at least one auxiliary camera;
performing, via an auxiliary lens of the at least one auxiliary camera, the auxiliary focus procedure using the adjusted number of focus scan steps;
determining whether the focus point has been found; and
in response to determining the focus point has been found, automatically synchronizing a position of a main lens of the main camera to that of the auxiliary lens.

18. The computer program product of claim 17, the program code further comprising code for:
in response to performing the auxiliary focus procedure and determining the focus point has not been found:
dynamically adjusting the number of focus scan steps of only the auxiliary focus procedure; and
performing, via the auxiliary lens, the auxiliary focus procedure using the adjusted number of focus scan steps;
wherein:
the number of focus scan steps is dynamically readjusted and the auxiliary focus procedure is reperformed until the focus point has been found;
the main camera focus procedure is unaffected by any adjustments to the auxiliary focus procedure; and
the main camera focus procedure is unaffected by the performance of the auxiliary focus procedure.

19. The computer program product of claim 17, the program code further comprising code for:
detecting, by at least one of the main camera and the at least one auxiliary camera, a composition of the current scene;
establishing the number of focus scan steps of the auxiliary focus procedure based on the composition; and
in response to determining the focus point has not been found:
determining from the composition whether the current scene is a flat scene;
in response to determining the current scene is a flat scene, increasing the number of focus scan steps of only the auxiliary focus procedure; and
in response to determining the current scene is a non-flat scene, decreasing the number of focus scan steps of only the auxiliary focus procedure.

20. The computer program product of claim 17, the program code further comprising code for:
performing, via the at least one auxiliary camera, a first verification of the focus point;
performing, via the at least one auxiliary camera, a second verification of the focus point;
determining whether the first verification and the second verification identify a same focus point;
in response to determining the first verification and the second verification identify a same focus point, confirming the focus point as a peak focus and synchronizing the position of the main lens to that of the auxiliary lens; and
in response to determining the first verification and the second verification do not identify a same focus point, performing, via the at least one auxiliary camera, at least one subsequent verification of the focus point, wherein the verification of the focus point is repeated until two sequential verifications identify a same focus point.

* * * * *